(12) United States Patent
Roberts et al.

(10) Patent No.: US 7,311,166 B2
(45) Date of Patent: *Dec. 25, 2007

(54) SNOWMOBILE SKI

(75) Inventors: Allen Roberts, Idaho Falls, ID (US); Joseph Brigham Hokanson, Idaho Falls, ID (US)

(73) Assignee: Starting Line Products, Inc., Idaho Falls, ID (US)

(*) Notice: Subject to any disclaimer, the term of this patent is extended or adjusted under 35 U.S.C. 154(b) by 42 days.

This patent is subject to a terminal disclaimer.

(21) Appl. No.: 11/343,947

(22) Filed: Jan. 30, 2006

(65) Prior Publication Data

US 2006/0157943 A1   Jul. 20, 2006

Related U.S. Application Data

(63) Continuation of application No. 10/177,393, filed on Jun. 21, 2002, now Pat. No. 6,991,056.

(51) Int. Cl.
*B62M 29/20* (2006.01)

(52) U.S. Cl. .................. 180/182; 280/28; 280/602; 280/609; 280/28.14; 280/845; 280/8; D12/7

(58) Field of Classification Search ........ 280/602–609, 280/28, 28.14, 845, 8; 180/182; D12/7
See application file for complete search history.

(56) References Cited

U.S. PATENT DOCUMENTS

| 2,593,025 | A |   | 4/1952 | Hanson et al. |
| 3,675,939 | A |   | 7/1972 | Vik |
| 3,870,331 | A |   | 3/1975 | Cryderman |
| 3,871,675 | A | * | 3/1975 | Lund ............................ 280/28 |
| 3,968,958 | A | * | 7/1976 | Huchette et al. ............... 267/47 |
| 4,491,333 | A |   | 1/1985 | Warnke |
| 4,705,291 | A |   | 11/1987 | Gauer |
| 5,135,249 | A |   | 8/1992 | Morris |
| 5,145,195 | A |   | 9/1992 | Campbell et al. |
| 5,145,201 | A |   | 9/1992 | Metheny |

(Continued)

FOREIGN PATENT DOCUMENTS

CA    2378638    8/2002

OTHER PUBLICATIONS

Letter dated Apr. 13, 2007, from Kevin W. Metheny, President/CEO of Ultimate Sports Inc. (USI) to Bradley B. Jensen of TraskBritt, regarding Infringement Analysis of USI Snowmobile Skis in relation to Starting Line Products Patent 6,955,236, 6,991,056 and Patent Pending Applications (3 pages).

(Continued)

*Primary Examiner*—Christopher P. Ellis
*Assistant Examiner*—Cynthia F. Collado
(74) *Attorney, Agent, or Firm*—TraskBritt

(57) ABSTRACT

This invention relates to an improved snowmobile ski having a vertical fin on the topside of the ski with a surface area large enough to minimize or prevent sideways slippage of the ski during a turn. The fin, if a single fin is used, is located adjacent the outboard edge of the ski. A snowmobile ski with dual topside fins having outwardly projecting lips along the upper edges of said fins has improved performance in deep snow.

21 Claims, 7 Drawing Sheets

U.S. PATENT DOCUMENTS

| | | |
|---|---|---|
| 5,242,187 A | 9/1993 | Diard et al. |
| 5,303,949 A | 4/1994 | Harper et al. |
| 5,344,168 A | 9/1994 | Olson et al. |
| D366,014 S | 1/1996 | Lindquist et al. |
| D367,018 S | 2/1996 | Bernat |
| 5,599,030 A | 2/1997 | Campbell et al. |
| 5,700,020 A * | 12/1997 | Noble ........................ 280/28 |
| D408,759 S | 4/1999 | Chapdelaine |
| 6,012,728 A | 1/2000 | Noble |
| 6,105,979 A | 8/2000 | Desrochers |
| 6,267,392 B1 | 7/2001 | Noble |
| 6,378,889 B1 | 4/2002 | Moriyama et al. |
| 6,431,561 B1 * | 8/2002 | Hedlund ....................... 280/28 |
| 6,520,512 B1 | 2/2003 | Lachance |
| 6,619,676 B2 | 9/2003 | Cormican |
| D484,072 S * | 12/2003 | Bruns ........................... D12/7 |
| 6,955,236 B2 * | 10/2005 | Roberts et al. ............. 180/182 |
| 6,991,056 B2 * | 1/2006 | Roberts et al. ............. 180/182 |
| D514,980 S * | 2/2006 | Kukkonen ................... D12/7 |
| D539,189 S * | 3/2007 | Huntimer et al. ............. D12/7 |
| 2003/0034619 A1 | 2/2003 | Bergstrom |
| 2003/0234129 A1 | 12/2003 | Roberts et al. |
| 2004/0061296 A1 | 4/2004 | Metheny |

OTHER PUBLICATIONS

USI Ski Cross Sections from 1988 to 2007 (10 pages).
Additional Facts Relating to Materials Submitted by Ultimate Sports Inc. ("USI") (1 page).

* cited by examiner

SNOWMOBILE SKI

CROSS-REFERENCE TO RELATED APPLICATIONS

This application is a continuation of application Ser. No. 10/177,393, filed Jun. 21, 2002, now U.S. Pat. No. 6,991,056, issued Jan. 31, 2006, which is related to application Ser. No. 10/176,172, also filed Jun. 21, 2002, now U.S. Pat. No. 6,955,236, issued Oct. 18, 2005.

BACKGROUND OF THE INVENTION

1. Field

This invention relates to snowmobile skis and in particular to snowmobile skis which are versatile, being useful on ice, hard-packed snow or in deep, powdery snow.

2. State of the Art

Snowmobile skis have undergone considerable evolution in recent years. Traditionally, metal skis had been utilized for decades until the recent development of plastic skis. Also, skis have gone from being essentially flat to having a curved or rocker shape as illustrated and claimed in various U.S. Patents to Noble, namely, U.S. Pat. Nos. 5,700,020, 6,012,728 and 6,267,392. The latter two patents also introduced the concept of having a plurality of keels and especially a tri-keel design wherein there is a central longitudinal keel which is deeper than two outboard keels. The advantage of this triple keel design is that it permits the skis to be more versatile, giving traditional steering control on hard surfaces, for example, ice, via the central keel, and then in deeper snow where the outboard keels take over some of the function of the central keel in permitting easy, straight-ahead steering and providing better control in turns, especially in deeper snow.

U.S. Pat. No. 4,491,333 to Warnke discloses a flat ski with flared flat running surface extensions to maximize ski flotation in deep snow. These flat wings are an extension of the ski running surface in that the margins of the ski are flared upward at an angle of 30° to 60° to the snow surface. The patent states that better lift is achieved in turns in deep snow without affecting the characteristics of the skis when run on hard pack snow. The flared ski margins serve to increase the effective width of the skis.

Snowmobiles have a long extended track which tends to cause the snowmobile to proceed along the longitudinal axis of the track even in a turn. The long track is rapidly moving and it tends to propel the snowmobile straight ahead even when the skis are turned, thus there is a plowing action of the skis in turns. Skis having some vertical surface area, such as provided by the three keels, militate to some extent against the sideways or lateral motion of turned skis. The snowmobile steering mechanism is structured with a camber so that when the snowmobile skis are turned the skis tilt away from a flat, running aspect. The straight-ahead, plowing effect may be pronounced in deep snow at any speed where the snow is very powdery and light such as that found frequently in the western United States.

BRIEF SUMMARY OF THE INVENTION

The instant invention relates to an improved snowmobile ski which has at least one outboard, topside fin having a substantially vertical orientation and sufficient vertical area to resist sideways slippage of the ski during a turn in deep snow, especially in deep, light, powdery snow. The fin is structured to be sufficiently strong to resist bending or breaking when the fin is pressing against snow during a turn of the ski. The fin generally has a surface area forward of approximately the midpoint of the ski which is approximately equal to the surface area of the fin aft of the ski's approximate midpoint. Also, the fin preferably has a surface area (sail area) which increases from the forward portion of the ski as it approaches the midportion of the ski and then decreases as the fin diminishes in height toward the aft end of the ski.

Multi-keel skis, especially those of a rocker design, are particularly suitable for the inclusion of a fin of the type described herein. The fin with respect to a rocker shape ski may also have an inverse rocker shape so that the surface area of the fin decreases both to the front and to the rear of the approximate midpoint of the ski.

Because skis do tilt during turns, the fin, if it is substantially vertical, which includes being substantially perpendicular to the top surface of the ski, will tilt so that its top portion is inboard of its normal position in a flat, straight-ahead running position. This inward tilt of the fin permits snow against which the fin is pressing to slide upwards and slide over the top of the fin. An additional feature of the invention is to provide a lip along the top edge of the fin, which lip protrudes to the outboard so that as snow slides up the fin during a turn it contacts this overhanging lip and is prevented from sliding up and over the top of the fin thereby giving the fin greater impact for a particular surface area than it would have without this top-edge lip.

In a preferred construction, the skis have dual topside fins, one fin along each. lateral edge of the ski. Also, a further preferred ski structure is where each such topside fin has an outwardly projecting lip along a significant portion of the upper edge of each fin, as discussed in more detail hereinafter.

An advantage of having the fin topside of the ski rather than creating deep keels beneath the ski to prevent side slippage is that a certain optimum depth of keel or keels is required to give the ski good handling under various kinds of conditions, such as ice or hard pack or slush as well as deep, heavier snow and deep, powdery snow. Thus, to design a single keel or multiple keeled ski to be specially constructed for optimum performance in deep, powdery snow may render the ski less versatile in various other snow conditions. Therefore, the advantage of having the fin topside is that on ice or hard pack and even in slush, a topside fin does not interfere with the steering characteristics of the underneath structures of the ski. However, the fin becomes functional in deeper snow and especially in deep, powdery snow, which is light and fluffy and which may not present much resistance to sideways slippage of the skis.

A single fin is sufficient to reduce sideways slippage so long as the fin is located on the topside of the ski substantially adjacent to the outboard edge of the ski. Such a construction means that a snowmobile will have a right and left ski with the right ski having its topside fin along its right edge and the left ski having its topside fin along its left edge. Where a tri-keel ski is employed, the fin may be substantially a vertical extension of the outboard keel of such a multi-keel ski. The fin, of course, may have a vertical orientation which departs from a perpendicular orientation such that the fin may be flared outboard so that the top edge of the fin is farther outboard than the lower portion of the fin. The term "vertical," as used herein, includes a perpendicular orientation as well as orientations which depart to some limited degree from perpendicular. The fin may have a sail area which is substantially planar or the fin may be constructed so that a curved surface is provided whereby the curve is vertically oriented such that the top edge of the fin is curved to the outboard side of the ski. Such a curved vertical surface may continue to form an overhanging lip. The fin, as desired, may be tilted inboard, however, its effectiveness is somewhat diminished except where an outwardly protruding lip is included.

While employment of a fin is particularly advantageous on the newer skis such as the curved, plastic, multi-keeled skis, it should be understood that the invention of a ski with a topside fin to prevent lateral slippage during turns in deep powder snow also applies to metal skis and to skis having an essentially flat running surface with a single central keel whether it be a shallow or deep keel. The probability of sideways slippage during turns in deeper snow is a problem with almost every structure and shape of snowmobile skis heretofore constructed or currently in use. A topside fin useful with a single keel ski may require greater sail area than a fin used in conjunction with an outboard keel.

The instant invention provides a significant improvement to all skis: flat skis, skis without an outboard keel, curved skis and multi-keel skis by inclusion of a substantially vertical topside fin, especially one having an outwardly curved lip. The topside fin is preferably located at the outboard margin of the ski with sufficient outer surface area to resist side slippage of the ski in a turn. As the snow is impacted by the fin, the snow densifies and with the inward tilt of the fin during a turn, because of the camber of the ski steering mechanism, the snow tends to flow upward along the outer surface of the fin. Such upward flow of the snow will overflow the top of a flat vertical fin. However, a laterally projecting lip provided at the top of the fin significantly minimizes this snow overflow, thereby maintaining the densified snow against the fin, improving resistance to side slippage, while the upward movement of the snow exerts a lifting force on the outwardly projecting lip, thereby providing better flotation of the ski, thus achieving a dual effect to improve performance of the ski in a turn.

Especially improved results are achieved with a multi-keeled ski, preferably a ski with a curved (convex) running surface and at least one topside fin projecting substantially vertically upward, although it may flare to the outboard. Such a fin is particularly effective when structured with an outwardly projecting lateral lip. The fin preferably has an irregular upper edge whereby the height of the fin is at its maximum approximately at the midpoint of the ski with a diminishing height both fore and aft although the fin area aft of the midpoint may be slightly greater than the area forward of the midpoint. Skis with dual fins with outwardly projecting lips are particularly effective.

BRIEF DESCRIPTION OF THE SEVERAL VIEWS OF THE DRAWINGS

The invention may be more fully described and understood by reference to the drawings contained herein.

DETAILED DESCRIPTION OF THE INVENTION

Figure 1:
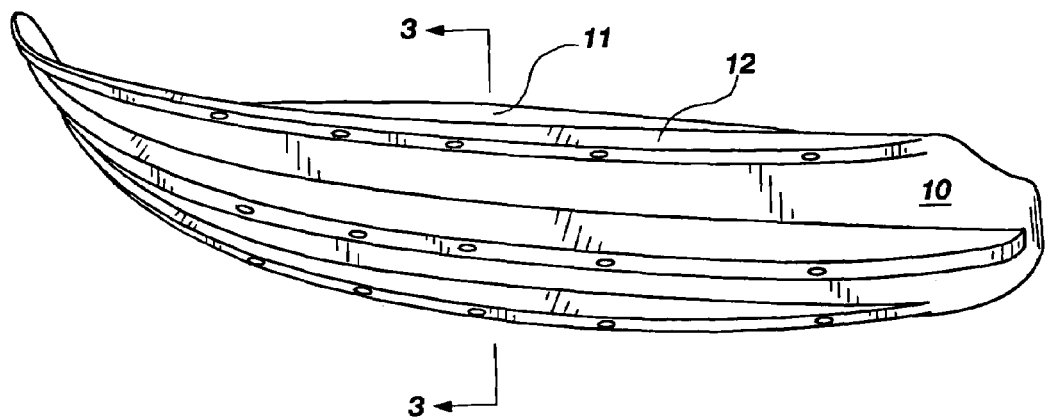
FIG. 1 is a perspective view of a tri-keel ski of the instant invention illustrating a single, outboard, vertical, flat fin.

FIG. 1 is a perspective view of a ski 10 of the instant invention illustrating a single, outboard, vertical flat fin 11. The ski 10 of FIG. 1 is a tri-keel structure with outboard keel 12 being shown.

Figure 2:
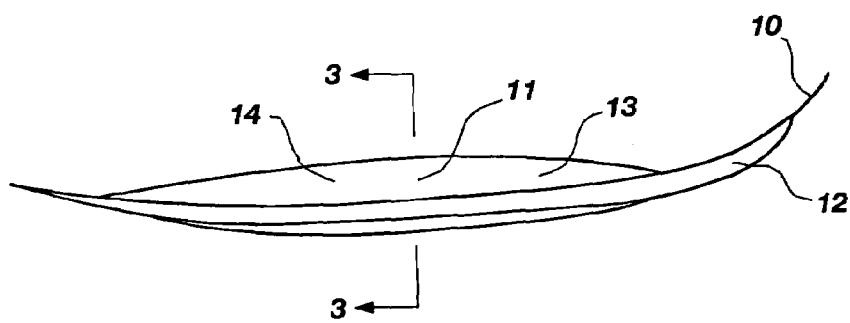
FIG. 2 is an elevational view of the ski on FIG. 1 in which a preferred profile of the vertical fin is illustrated.

FIG. 2 is an elevational view of the ski on FIG. 1 in which a preferred arcuate profile of the vertical fin 11 is illustrated. The forward area 13 and the aft area 14 are substantially equal when measured from an approximate midpoint of the fin 11. This midpoint is typically laterally aligned with the attachment means of the ski 10 whereby the steering and support mechanism of the snowmobile is attached to the ski, i.e., approximately the midpoint longitudinally of the ski running surface. While the ski of FIG. 2 is illustrated with a curved, convex running surface, an arcuate-shaped fin is also useful with a ski having an essentially flat running surface.

Figure 3:
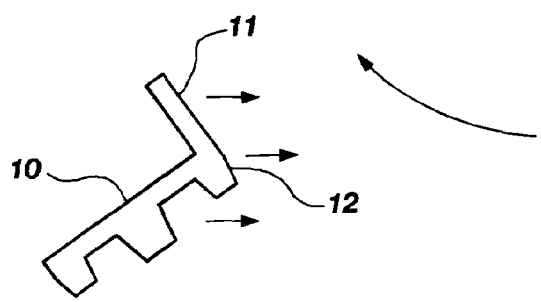
FIG. 3 is a lateral cross-sectional view along section line 3—3 of the ski of FIG. 1 showing the overflow of snow over the top of the vertical fin of FIG. 1 during a turn.

FIG. 3 is a lateral cross-sectional view of ski 10 along section lines 3—3 of FIG. 2. This sectional view is illustrated at a titled angle such as would be experienced by the ski during an inboard turn. The camber of the steering mechanism results in such a tilt. As can be seen from FIG. 3, the outboard keel and the fin provide most of the effective sail area which minimize any side slip of the ski during an inboard turn. As stated elsewhere herein, a dual-fin ski is especially useful. While it is the outboard fin on the outboard ski which is most useful in turns in preventing side slippage, the inboard fin on the inboard ski also significantly assists in preventing side slippage and where the fins are provided with outwardly projecting lips, all four fins with lips assist in providing improved flotation. In the description herein, the outboard ski is the right ski in a left-hand turn while the left ski is the inboard ski in a left turn; and vice-versa during a right turn.

FIG. 3 illustrates the overflow of snow (curved line with arrow) over the top of the fin during a turn, similar to the escape of wind from the sails of a sail boat when it lists drastically to leeward. While even light, powdery snow has greater density than air, when such powdery snow is in an agitated state, as occurs when it is disturbed by a snowmobile ski cutting through it, the snow assumes a much lower density than when sitting in a settled state and its acts like a very low density fluid. This type of snow is frequently encountered after a snow storm in the Western U.S. and Canada although it can be encountered anywhere that a dry snowfall occurs. The term "dry" refers to snow which has fluffy crystals of low moisture content.

Figure 4:
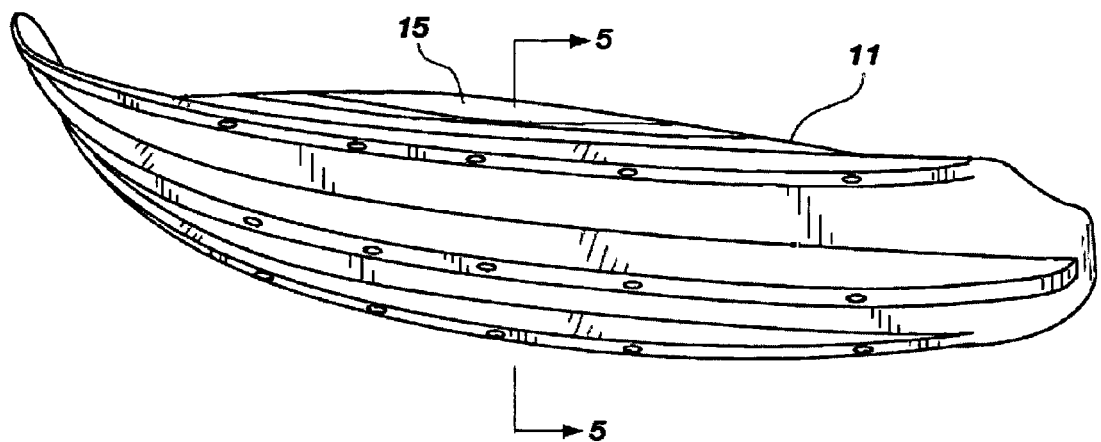
FIG. 4 illustrates a ski having a vertical fin with a curved lip projecting laterally outboard from the top of the fin.

FIG. 4 is a perspective view similar to FIG. 1, however, the fin 11 has an outwardly projecting lip 15 which is effective to prevent snow overflow of the fin (see FIG. 5) as well as to act as a foil, e.g., similar to an air foil, to provide some additional flotation. The lip 15 is integral with the top edge of the fin and is spaced vertically from the top of the ski and is thus well removed from the surface of the snow except when the ski is running in deep, light, powdery snow.

The lip 15 preferably has substantially the same cross-sectional shape and dimension over its length although it may gradually emerge from the fin near its front to a maximum width near the midpoint of the fin and then gradually merge with the fin near its rear. The area of the lip is as important generally as its length. Typically, the lip 15 has a length which is at least about 20% of the length of the upper edge of the fin 11. Fin 11 has a generally arcuate-shaped upper edge, as illustrated in FIG. 2, although for skis with a substantially curved (convex) running surface, the upper edge of the ski may be linear since the curve of the ski will provide a maximum height of fin 11 near its midpoint. A laterally projecting lip attached to a fin with a substantially linear upper edge is effective for minimizing overflow of snow over the fin, but a lip which is substantially linear over its length generally provides less flotation than a lip with an arcuate shape along its length.

A flat-faced fin is very useful in minimizing side-slipping of turned snowmobile skis. However, a ski as shown in a lateral cross-section in FIG. 5 which has a fin with an outwardly projecting lip 15 which is over-curved, i.e., forms an enclosed arch, traps the upward flow of snow along the vertical fin to significantly increase the effectiveness of the fin. The lip 15 has at least part of its lower or underneath surface at an angle of about 90° to the substantially planar surface of the outer fin surface. The lip curves downward along its outermost edge so that part of the lower lip surface is substantially parallel to the outer surface of the fin. As the fin presses against the snow during a turn, it tends to densify the snow so that the upward flow of snow may have a greater density than it would otherwise have, so that the upward force on the projecting lip may provide increased flotation. The ski illustrated in FIG. 5 has a curved lip which is generally preferred in minimizing overflow of snow along the fin and to provide some flotation effect.

The camber of the steering causes a tilt of about 4 to about 8° depending upon the severity of the turn. The maximum camber occurs when the steering is at its innermost locked position.

Figure 5:
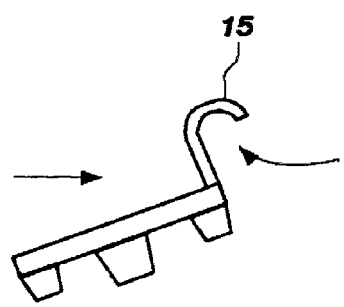
FIG. 5 is a cross-sectional view of the ski in FIG. 4 along section lines 5—5.
Figure 6:
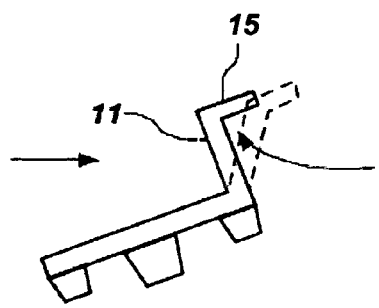
FIG. 6 is a cross-sectional view of a ski with a vertical fin and an outwardly projecting fin lip.

FIG. 6 is similar to FIG. 5 except that lip 15 is a laterally projecting, substantially planar lip. Such a lip is effective with a fin which has either a preferred arcuate upper edge or a linear upper edge. In both FIGS. 5 and 6, the laterally directed arrows show the possible sideways slip of the skis while the upwardly directed arrows show the snow resistance caused by the fin and the trapping of the snow under the lip, preventing snow overflow and providing additional flotation. As shown in FIG. 6, the fin 11 may exhibit a substantially vertical orientation (or, more specifically, substantially perpendicular to the upper surface of the ski) or it may exhibit an outward slant, as shown by dashed lines, of up to, for example, 25°.

Figure 7:
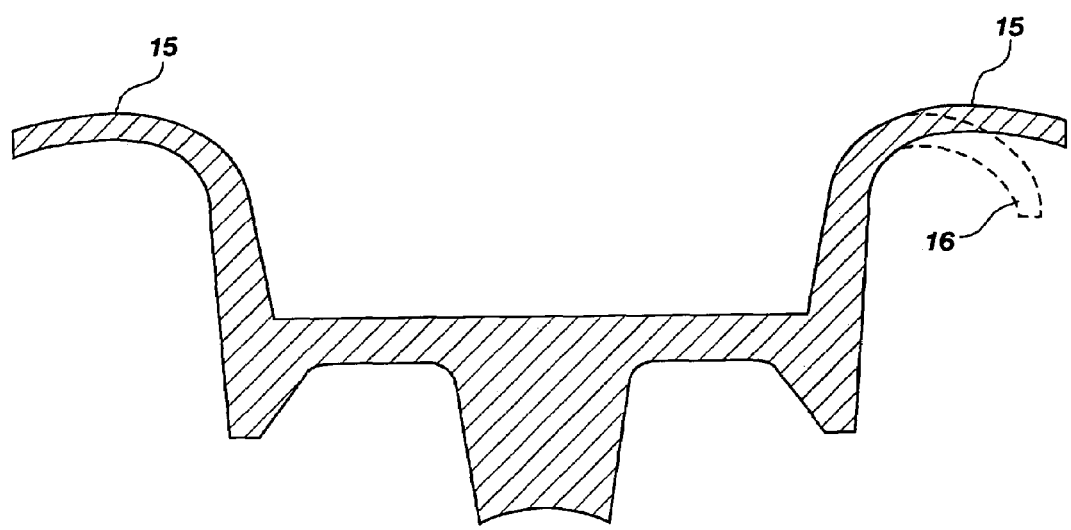
FIG. 7 is a cross-sectional view of the ski of FIG. 8 along section lines 7—7 with a pair of substantially vertical fins integral with a tri-keel ski wherein the outer surface of the fin is substantially a continuation of the outer surface of each outboard keel and having an outwardly projecting curved lip along the upper edge of each fin.

FIG. 7 is a cross-sectional lateral view of a ski showing a pair of upstanding fins along each outer edge of the ski wherein each fin proceeds vertically at a slight outward flare for a distance and then has an arched lip which curves out perpendicularly from the fin and then curves slightly downward to terminate along its outermost edge. The dotted lines show a lip which is over-curved so that a portion of its interior surface 16 is substantially parallel to the outer surface of the fin. This particular arched structure has a lip which is defined herein as an over-curved lip that may include substantially a half circle. It is a particularly useful shape inasmuch as when the ski is tilted as shown in FIG. 5 and snow at the outboard edge of the ski is sweeping up along the fin as the fin is pushing in the lateral direction the arched lip very effectively captures the upwardly moving snow and prevents it from spilling over the top of the fin. This arched lip having a longitudinally arcuate shape also is effective in providing improved flotation under substantially all operations in deep snow in comparison to a laterally projecting planar lip.

As noted above, a snowmobile ski fitted with a single fin, for example, as shown in FIG. 1, may be particularly useful even where the fin is located along only one edge of the ski so long as that edge is the outward edge of the ski. Skis of this type would be of a left and right variety with the right-hand ski having its fin along its right edge when viewed from the rear of the ski and the left-hand ski having the fin along its left edge when viewed from the rear of the ski. Fins on the interior edges of the ski are less effective because the fin has very little to do since the outboard fin functions to do most of the work in a turn. An inboard fin on the inboard ski is effective so that skis with dual fins are especially useful.

The fins to be optimally effective have a maximum sail area. This sail area being defined herein as the area of the fin which resists lateral motion in deep powdery snow. A larger sail area may be required where the fin does not have an upper outwardly projecting lip. Also, a larger sail area may be required for a ski without an outboard keel to achieve a desired level of resistance to side slippage. For a conventional ski having a length of about 35 inches to about 45 inches, a fin with a sail area of about 25 square inches to about 50 square inches enhances the control of a snowmobile in deeper snow and minimizes substantially the lateral slippage or sideways slippage of the skis during turns in deep snow without causing excessive drag in deep, powdery snow or interfering with ski performance in slush or on hard pack or icy conditions.

Fins included on a ski with an outboard keel may have less sail area inasmuch as the outboard keel provides some resistance to side slippage.

While some older skis have previously been designed with some structures on top of the ski, the topside structures have been generally included for the purpose of strength, rigidity or aesthetics. Such prior structures have been included also for providing attachment means for attaching the steering mechanism of the snowmobile to the ski. Also, typically these topside structures have been spaced to the inboard from the outer edge of the skis and have not been either structurally engineered or positioned to provide any significant resistance to lateral slippage of the skis during a turn. The more inboard an upstanding structure is, the less exposed it is to snow during a turn inasmuch as the tilt of the ski raises the outboard edge of the ski such that any topside inboard structure is essentially shielded from impact with the snow. For example, in U.S. Design Pat. 366,014 a pair of ridges is located topside of the ski extending from the tip of the ski to a position somewhat adjacent the rear of the ski. These ridges appear to be substantially the same height and appear to have a curved cross-section such that the ridges are there either for aesthetic purposes or to provide some rigidity. The ridges do not appear to be structured or designed to preclude any resistance to lateral slippage of such a ski in a turn.

The topside preferred location of a fin for the purpose of minimizing side slippage in turns is at the very lateral edge of the ski, although it may be slightly inboard of the ski edge if the fin has significant height and area or is tilted outwardly so that a significant portion of the fin is aligned with or is outboard of the outer edge of the ski. Recessing the fin even a slight distance inboard of the outer edge tends to diminish the effectiveness of a fin, even one having an outward tilt. This slight diminishment may, however, be tolerable for multipurpose skis where the upturned tip of the ski substantially protects or prevents snow contacting such a fin during straight ahead running.

Preferred fin structures for skis of the instant invention are ones which are longitudinally straight with the longitudinal axis of the fin being substantially parallel to the longitudinal axis of the ski. Fins with a slight longitudinally arcuate shape, when viewed from above, may be useful so long as a substantial portion of the fin is along the outer edge of the ski, especially that portion of the fin near the longitudinal midpoint of the ski. Further, as noted hereinabove, an outwardly projecting lip featured along the upper edge of a topside fin significantly improves the effectiveness of the fin in preventing side slippage and improving snow flotation in both turns and during straight ahead running in deep, powdery snow.

Figure 8:
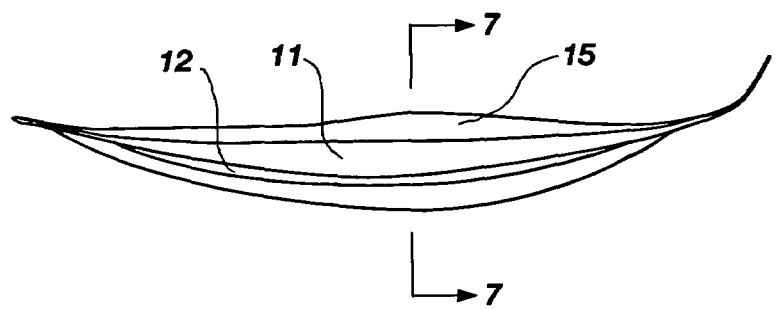
FIG. 8 is an elevational view of a ski with a longitudinal arcuate-shaped fin and lip.

The ski construction which is most versatile and especially effective in both light and heavy deep snow is that shown in an elevational view in FIG. 8. The overturned lip 15 preferably extends essentially the whole length of an upright fin. The preferred fin shape is that illustrated in FIG. 7, which is a mid-ski cross-sectional view along section lines 7—7 of FIG. 8, where its upper edge has an arcuate shape, i.e., an inverse rocker shape. This inverse rocker shape and the projecting, overturned (arched) lip 15 provides excellent flotation (lift) when running straight in deep snow and for maintaining excellent control in all turns.

While a lip of substantially any size and shape which projects outwardly from the upper edge of an upright fin provides some effectiveness against snow overflow, an arched lip having a substantial length is generally preferred. Such an arched lip may merge into the fin at the most forward point of the lip, preferably near the front terminus of the fin, which is preferably near the base of the upturned tip of the ski. The arched lip may have approximately the same lateral shape and lateral dimension over its entire length. The rear terminus of the lip may or may not merge into the fin. A preferred lip structure for the lip is one where the lip transitions from an arched structure to an essentially planar structure at each terminus of the lip so that the lower surface of the lip essentially merges with and becomes part of the lower running surface of the ski where each merge occurs.

Skis which are substantially symmetrical in cross-section are generally preferred, i.e., an identical fin and outwardly projecting lip is provided along each lateral edge of the ski, as illustrated in FIG. 7. Also, it is generally preferred that the ski be one which is a tri-keel or dual-keel ski wherein rocker-shaped keels are along the lateral edges of the ski and the fin is essentially an upward projection which continues the outer surface of each outer keel in an upward direction.

It is generally preferred that the fin sail area is at least equal to the outboard surface area of an outer keel of the snowmobile ski and that the enclosed surface area of the arched lip is at least equal to the sail area of the fin. The lowest portion of the arched lip is typically near the forward portion of the fin. Generally, it is preferred that the lowest portion of the lip be sufficiently above the running surface of the ski so that it does not contact harder packed snow during running straight ahead or in turns or the lip transitions in shape to merge with or become part of the lower running surface of the ski at the fore and aft portion of a lip. Thus, a preferred lip is curved or curvilinear along the length of the upper edge and is laterally arched or curved with the interior surface of such arched lip facing downward.

Figure 9:
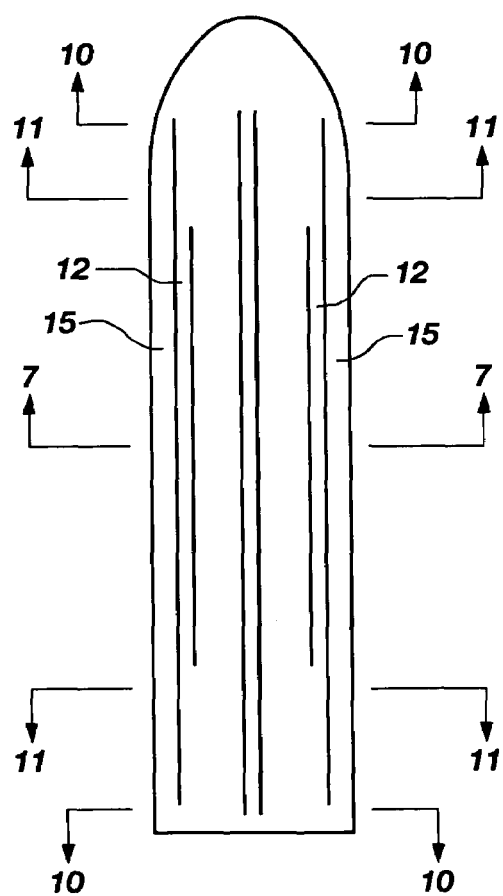
FIG. 9 is a bottom, plan view of the ski of FIG. 8.

As may be seen from FIG. 9, a plan view of the bottom of a ski having dual fins with outwardly projecting lips 15, the outer edges of the two lips 15 are substantially parallel to one another. Such a ski has a substantially uniform width when measured from the outer edge of one lip to the outer edge of the other lip. Each lip also has a substantially uniform width over its entire length. Each lip substantially merges into the ski tip (see FIG. 10, a cross-sectional view along section lines 10—10 of FIG. 9) so that the ski tip at the region of such lip merger is substantially the same width as the width of the ski when measured from the outer edge of one lip to the outer edge of the other lip at any point along the length of the lips.

Figure 10:
FIG. 10 is a cross-sectional view of the ski of FIG. 9 along section lines 10—10.

Further, as illustrated in FIGS. 9 and 10, the merger of the lips fore and aft may merge into the running surface of the ski so that the lip contact with deep snow provides a gradual contact at the front end and a gradual departure at the rear of the ski. The merging of lips 15 at the rear of the ski into the lower running surface helps to keep the ski in a better planing position. If such rear merger is not incorporated into a ski with outwardly projecting raised lips, such skis will tend to have the tip of the ski riding higher than desired for good planing when the ski is running forward in deep snow.

Another feature of the ski illustrated in FIG. 9 is that the running surface of the ski which contacts hard pack snow is a substantially uniform width over substantially its entire length and is substantially symmetrical about a longitudinal axis of the ski.

Certain embodiments of the invention provide an improved snowmobile ski for running on different snow conditions in which the ski has a lower running surface structured and adapted for running on hard pack and/or icy surfaces and a raised running surface which is at least partially elevated and outboard, especially its mid-ski portion, from the lower running surface. The raised running surface is preferably connected or joined to the ski by a fin 11 or web member which is preferably at least partially substantially vertical and is preferably substantially contiguous in length with the raised running surface.

Such a ski is preferably a unitary ski, although an existing ski could be retrofitted with a fin 11 having a projecting outboard lip 15. The fin 11 and outboard lip 15, if made of metal, could be riveted or welded to a metal ski, or an integral fin and lip structure made of plastic could be fixed to a plastic ski by screws or a structurally strong glue, such as an epoxy. Generally, however, a unitary ski is provided by appropriate manufacturing techniques. A ski can readily be made of plastic as a one-piece construction by hot-forming a sheet of thermoplastic material or by casting either a thermoplastic or thermosetting resinous material in an appropriately shaped mold.

Skis of the type described in the immediately preceding paragraphs are preferably symmetrical about a vertical plane passing through the longitudinal axis of the ski. One such type of ski is illustrated in FIGS. 7, 9, 10 and 11. By comparing the cross-sectional views of FIGS. 7, 10 and 11, which are cross-sectional views at mid-ski portion (FIG. 7), forward and aft position (FIG. 10), and quarter ski position (FIG. 11), the gradual development of a raised running surface can be seen. The gradual change in shape from a deep arched configuration (FIG. 7) to a slightly less arched configuration (FIG. 11) to a merged shape is a generally preferred configuration. Also, as can be seen from FIGS. 8 and 9 and from cross-sectional views 7, 10 and 11, the outer keels 12 are illustrated as being shorter and less deep than those generally utilized on skis without an elevated running surface while still retaining good running and steering performances in all types of snow conditions.

Figure 12:
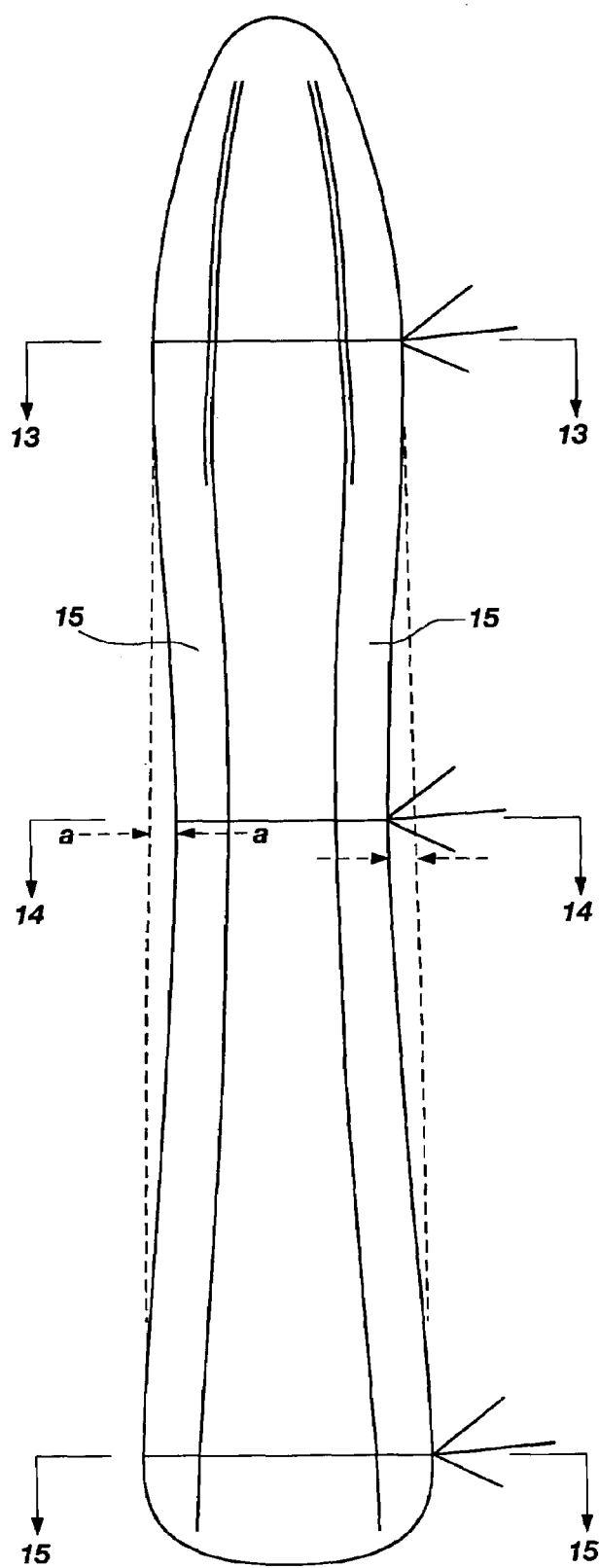
FIG. 12 is a plan view of the top of a snowmobile ski with laterally projecting lips which have outer parabolic edges.
Figure 13:
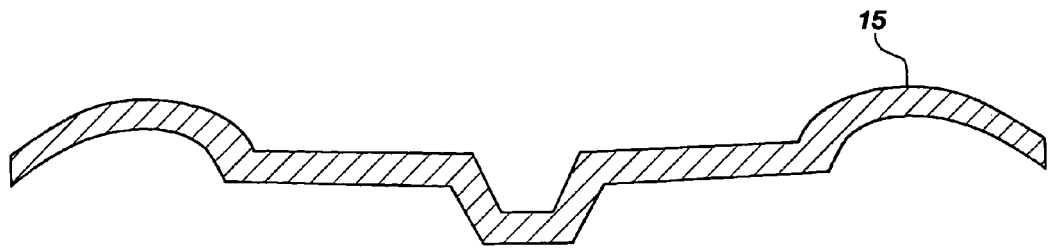
FIG. 13 is a cross-sectional view of the ski of FIG. 12 along section lines 13—13.
Figure 14:
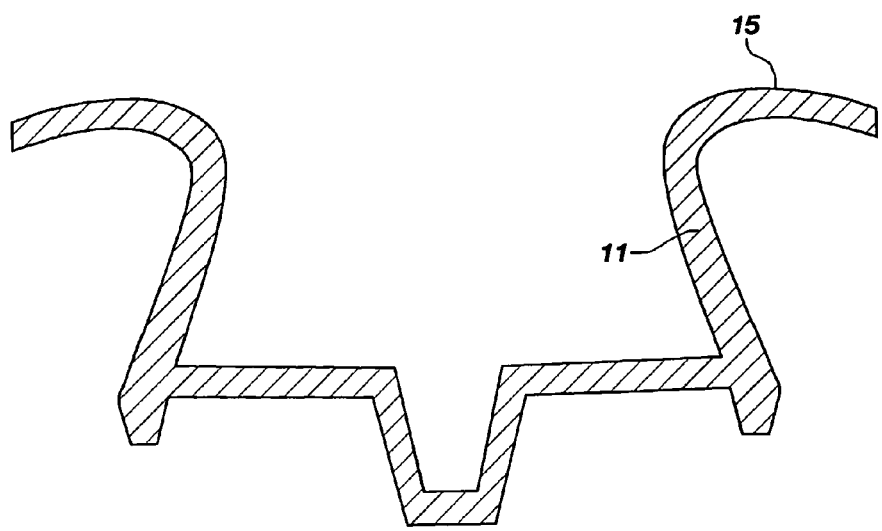
FIG. 14 is a mid-ski cross-sectional view of the ski of FIG. 12 along section lines 14—14.
Figure 15:
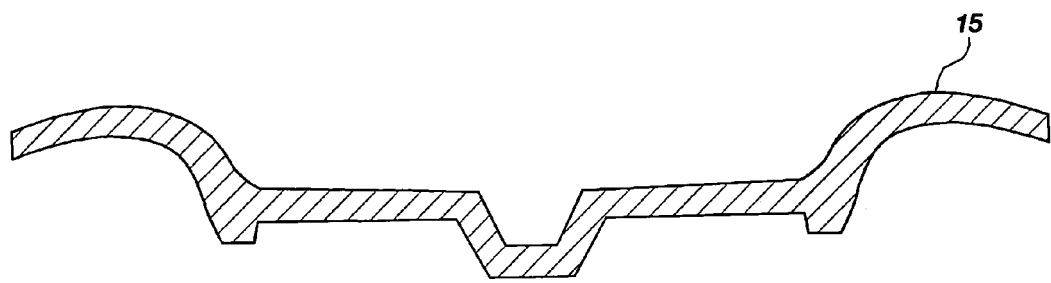
FIG. 15 is a cross-sectional view of the ski of FIG. 12 along section lines 15—15.

A unique ski structure is shown in FIGS. 12, 13, 14 and 15, wherein FIG. 12 is a plan view of the top of a ski having parabolic lateral lip edges. While a parabolic snowmobile ski has certain performance characteristics without an upper or raised running surface, the ski in FIG. 12 has a parabolic-shaped outer edge of the outwardly projecting lip of the ski. The outer longitudinal edge of the lip 15 follows a parabolic contour such that the width between opposed lateral edges of the outwardly projecting lips is less at the waist of the ski, i.e., central region, than at the fore or aft portions of the ski. The lateral edges of the running surface of the ski are essentially straight and parallel to one another, which is also true of the keels, whether one, two or three keels are utilized. Thus, the lower running surface may be conventional, e.g., such as the running surfaces illustrated in U.S. Pat. Nos. 5,700,020, 6,012,728 and 6,267,342 to Noble.

The parabolic shape of the upper running surface lateral edges contacts the snow only when deep snow is encountered whereby the parabolic shape assists the skis in effectively turning since the camber built into the steering mechanism to tilt, thereby dipping the inboard edge of the lip into the snow, causing the ski to tend to carve a turn along the curvature built into the edge of the inboard lip.

The curvature built into the lateral edges of the elevated lips is relatively minimal, the curvature realizing a depression of about one-quarter to about one inch from an imaginary straight line connecting the maximum projection both fore and aft of the lip 15 as illustrated in FIG. 12 at a—a.

This curvature may also be an arc, i.e., portion of a circle, about a radius of about 20 to about 60 inches, although radii intermediate of those lengths are preferred.

The inward tilt of the fins 11 to create a parabolic shape with lips 15 of uniform widths over their length can create a molding challenge, however, the use of a mold having at least three segments can be successfully used. Also, the ski can be made with the fin substantially vertical by thermoforming of a thermoplastic sheet, then putting the ski in a hot press to urge the two opposed fins towards one another to cause the desired shape to occur.

While a ski with parabolic edges on the upper raised running surface has certain advantages, it is also within the scope of the invention to have a ski with an inwardly tilted fin with the raised running surface having parallel outer edges. This is accomplished by having a uniform inward tilt of the fin with a lip, for example, of a uniform width, or in the instance of a fin having a greater inward tilt at its midportion than at either end, then a lip which increases gradually in width from each end towards the center can provide a straight, linear edge whereby the outer edges of the raised running surface are parallel to one another and parallel to the outer edges of the lower running surface.

An inward tilt of the fin equivalent to a typical camber of a steering mechanism is preferred, however, inward fin tilts less than about 5° and inward fin tilts greater than about 8° may also find utility for certain purposes and snow conditions.

Although the instant invention has various useful embodiments, the invention is not intended to be limited by the above description or attached illustrations but to include all embodiments and variations as set forth in the attached claims.

What is claimed is:

1. A snowmobile ski comprising:
   a body having an intended running surface, a second, opposing surface, a first longitudinally extending edge and a second longitudinally extending edge;
   a first lip extending laterally outwardly relative the first edge of the body, the first lip having a first edge and a second edge, wherein both the first edge and second edge of the first lip are vertically displaced from the second, opposing surface of the body at a location that is approximately at a longitudinal midpoint of the ski.

2. The snowmobile ski of claim 1, wherein at least a portion of the first lip exhibits an arcuate profile along a longitudinal length thereof.

3. The snowmobile ski of claim 1, further comprising a second lip extending laterally outwardly relative to the second edge of the body.

4. The snowmobile ski of claim 3, wherein the second lip includes a first edge and a second edge, wherein both the first edge and second edge of the second lip are vertically displaced from the second, opposing surface of the body at a location that is approximately at the longitudinal midpoint of the ski.

5. The snowmobile ski of claim 1, further comprising at least one keel member protruding from the intended running surface.

6. The snowmobile ski of claim 5, wherein the at least one keel member includes a first keel member substantially laterally centered on the intended running surface.

7. The snowmobile ski of claim 6, wherein the at least one keel member further includes a second keel member laterally positioned adjacent the first edge of the body and a third keel member laterally positioned adjacent the second edge of the body.

8. The snowmobile ski of claim 1, wherein the first lip exhibits a variable width.

9. The snowmobile ski of claim 8, wherein the first lip exhibits a maximum width at a location proximate the midpoint of the ski.

10. The snowmobile ski of claim 1, wherein the first lip gradually merges into the second, opposing surface of the body in an intended forward direction.

11. The snowmobile ski of claim 1, wherein the first lip exhibits a substantially constant width over substantially its entire length.

12. The snowmobile ski of claim 1, wherein the first lip exhibits a substantially concave lower surface.

13. The snowmobile ski of claim 1, further comprising at least one substantially upright fin extending between the first edge of the body and the first edge of the lip.

14. The snowmobile ski of claim 13, wherein the lip extends over at least about 40% of a length of an upper edge of the at least one fin.

15. The snowmobile ski of claim 13, wherein a surface of the at least one fin disposed between the first edge of the body and the first edge of the lip exhibits an area of about 25 square inches to about 50 square inches.

16. The snowmobile ski of claim 13, wherein the at least one fin exhibits a maximum height of about four inches.

17. The snowmobile ski of claim 13, wherein a height of the at least one fin diminishes from a maximum height near the longitudinal midpoint of the ski to a minimum height proximate to both a fore and an aft termini of the at least one fin.

18. The snowmobile ski of claim 13, wherein the at least one fin gradually diminishes in height in both fore and aft directions to termini that are less than about one inch in height.

19. The snowmobile ski of claim 18, wherein the termini substantially merge into the second, opposing surface of the ski.

20. The snowmobile ski of claim 13, wherein the intended running surface exhibits a substantially convex geometry along its length.

21. The snowmobile ski of claim 13, wherein the at least one fin is integrally formed with the body.

* * * * *

UNITED STATES PATENT AND TRADEMARK OFFICE
CERTIFICATE OF CORRECTION

| | | |
|---|---|---|
| PATENT NO. | : 7,311,166 B2 | |
| APPLICATION NO. | : 11/343947 | |
| DATED | : December 25, 2007 | |
| INVENTOR(S) | : Allen Roberts et al. | |

It is certified that error appears in the above-identified patent and that said Letters Patent is hereby corrected as shown below:

On the title page:
In ITEM (56) References Cited
U.S. PATENT DOCUMENTS
2nd Column, after 6th entry     insert    --5,040,818 A    8/1991 Metheny--

In ITEM (56) References Cited
FOREIGN PATENT DOCUMENTS
2nd Column, before 1st entry     insert    --FR    2662610     12/1991--

In ITEM (56) References Cited,
OTHER PUBLICATIONS
2nd Column, 4th line     change "Patent" to --Patents--

Figure 11:
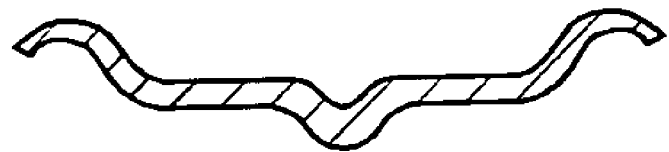
FIG. 11 is a cross-sectional view of the ski of FIG. 9 along section lines 11—11.

| | | |
|---|---|---|
| COLUMN 2 | LINE 30 | change "along each. lateral edge of the ski." to --along each lateral edge of the ski.-- |
| COLUMN 3 | LINE 58 | change "ski on FIG. 1" to --ski of FIG. 1-- |
| COLUMN 3 | LINE 66 | change "ski in FIG. 4" to --ski of FIG. 4-- |
| COLUMN 4 | LINE 32 | change "ski on FIG. 1" to --ski of FIG. 1-- |
| COLUMN 4 | LINE 46 | change "at a titled angle" to --at a tilted angle-- |
| COLUMN 5 | LINE 1 | change "and its acts like" to --and it acts like-- |
| COLUMN 5 | LINE 40 | change "The lip curves" to --The lip 15 curves-- |
| COLUMN 5 | LINE 47 | change "curved lip which" to --curved lip 15, which-- |
| COLUMN 5 | LINE 51 | change "a tilt of about 4" to --a tilt of about 4°-- |
| COLUMN 6 | LINE 4 | change "arched lip which" to --arched lip 15, which-- |
| COLUMN 9 | LINE 11 | change "views 7, 10 and 11," to --views of FIGS. 7, 10 and 11,-- |
| COLUMN 9 | LINE 31 | change "6,267,342 to Noble." to --6,267,392 to Noble.-- |

Signed and Sealed this
Fifteenth Day of February, 2011

David J. Kappos
*Director of the United States Patent and Trademark Office*

CERTIFICATE OF CORRECTION (continued)
U.S. Pat. No. 7,311,166 B2

In the claims:

| | | | |
|---|---|---|---|
| CLAIM 9 | COLUMN 10 | LINES 48,49 | change "the midpoint" to --the longitudinal midpoint-- |
| CLAIM 13 | COLUMN 10 | LINE 60 | change "the first edge of the lip." to --the first edge of the first lip.-- |
| CLAIM 14 | COLUMN 10 | LINE 61 | change "wherein the lip" to --wherein the first lip-- |
| CLAIM 15 | COLUMN 10 | LINE 66 | change "the first edge of the lip" to --the first edge of the first lip-- |